(12) United States Patent
Waddell et al.

(10) Patent No.: US 7,620,303 B1
(45) Date of Patent: Nov. 17, 2009

(54) CAMERA COMPASS

(75) Inventors: Lawrence D. Waddell, Oak Grove, MN (US); James P. Loe, Anoka, MN (US); D. Michael Lillquist, Oak Grove, MN (US); Steven J. Lundeen, Ramsey, MN (US)

(73) Assignee: Reel Sport Creations, Inc., Roseville, MN (US)

( * ) Notice: Subject to any disclaimer, the term of this patent is extended or adjusted under 35 U.S.C. 154(b) by 254 days.

(21) Appl. No.: 11/742,055

(22) Filed: Apr. 30, 2007

(51) Int. Cl.
  *G03B 17/08* (2006.01)
  *G03B 17/00* (2006.01)
  *A01K 97/00* (2006.01)
(52) U.S. Cl. ............... 396/25; 396/419; 43/4
(58) Field of Classification Search ............ 396/25, 396/419, 420, 428; 348/81; 43/1, 4, 17, 43/43.1, 44.9
See application file for complete search history.

(56) References Cited

U.S. PATENT DOCUMENTS

| 3,134,188 | A | * | 5/1964 | Petersen | 43/17 |
| 5,048,220 | A | * | 9/1991 | Harris | 43/4 |
| 6,763,776 | B1 | * | 7/2004 | Perri et al. | 114/218 |
| 6,909,845 | B1 | * | 6/2005 | Schillinger | 396/25 |

* cited by examiner

*Primary Examiner*—W B Perkey
*Assistant Examiner*—Minh Q Phan
(74) *Attorney, Agent, or Firm*—C. G. Mersereau; Nikolai & Mersereau, P.A.

(57) ABSTRACT

An ice fishing underwater camera holder is disclosed which is used for holding the camera at a desired depth and rotating the camera to the desired viewing area. The camera holder comprises a disk for setting over a hole in the ice. The disk having a slot for passing a cable through and for holding the cable by use of a plurality of cleats aligned on the top of the disk for winding the cable between the cleats. To adjust the length of the cable, the cable can be removed from the cleats and the length of cable passing through the slot adjusted before winding the cable through the cleats. The cable has a camera on one end to view fish or other objects below the ice. To turn the camera to a desired position for viewing the disk is rotated thus turning the cable to align the camera.

7 Claims, 2 Drawing Sheets

CAMERA COMPASS

BACKGROUND OF THE INVENTION

1. Field of the Invention

This invention relates to covers for ice holes which hold a cable in place for an underwater camera.

2. Description of the Related Art

Until now there have not been any reliable means for holding the underwater camera in place for both depth and angle of viewing while ice fishing other than holding the cable by hand and twisting it to turn the camera. The problem of holding the camera steady at the desired depth and pointing the camera in the desired direction is addressed.

The invention relates to the securing and steadying of an underwater camera as it is submerged under water for viewing on a wired monitor above the water, particularly in an environment where the lake or body of water is frozen with a crust of ice from 7.62 cm (3 inches) to 122 cm (4 feet) or more in thickness. A hole must be bored through the ice, usually by an ice auger, so the underwater camera can be allowed to submerge into the water below the ice. While the camera is submerged, the invented device will secure and steady the camera in a fixed position.

The use of an underwater camera, particularly used for ice fishing is a difficult task without the aid of a device for steadying the camera. The intent is to provide a device to the user to secure and steady the camera, so as to allow the user to do other tasks, usually fishing.

In the realm of ice fishing scenarios, the primary objective of the fisherperson is to spend as much time as possible concentrating on the physical act of fishing. In the recent years, new technologies have been introduced to the sport, particularly underwater cameras. With the large number of users of this new technology, there is also an equal need for a device to secure and steady the camera in a manner as to allow the fisherperson to rapidly locate and identify fish or their bait. The camera user is normally using one or both hands to twist or turn the cable attached to the submerged camera as a method of rotating the camera until the desired viewing direction is reached. Since there is no way of knowing how far the camera is rotating every time a twist or turn is applied to the cable, it is very difficult and time consuming to fully understand which direction you are viewing.

Other devices for this task are available. However, they are comprised of small parts that are easily lost, are too expensive for the average fisherperson, or are large and cumbersome to carry around. Also, any one of the currently available devices could easily be dropped down the very hole in the ice that they are designed to be used with, and consequently lost.

SUMMARY OF THE INVENTION

The invention described herein is a device that will support and stabilize an underwater camera equipped with a monitor that is connected by an electrical cable that will be viewed above the waterline, and allow the user of the device to precisely adjust the depth and direction of the underwater camera. The cleats molded into the device are the means to which the camera cable is fastened to the device. A slot is provided to allow the camera cable to be lowered into the water directly through the product. The camera is to be lowered into the water through a hole in the ice not to exceed 25.4 cm (10 inches) in diameter. When the camera user wishes to suspend the camera at a specific depth or direction, he/she would connect the cable from camera to the device and place it directly on the ice allowing the submerged camera to be secured and stabilized at the exact depth and direction that the camera is pointed. It is designed in a manner which makes it impossible to lose this product down even the largest of the standardized fishing holes. At present, the largest standard size auger available is 25.4 cm in diameter.

When a change of depth is desired, the cable can be loosened from the device and more or less cable can be allowed to pass through the device until the desired viewing depth is reached and the cable re-fastened to the device.

When a change of viewing direction is desired, the device is simply lifted up and off the ice as little as 32 mm (1/8 inch) and rotated in any direction (360 degree of rotation) and set back down on the ice when the desired direction is reached. The submerged camera will rotate with the device and thus allowing precise directional movement of the submerged camera.

The device has been designed to prevent freeze-up of the hole that it is being used with in conjunction with an underwater camera. This function is limited and will only prevent less freeze-up than a similar hole that is not covered with this device. In addition an insulation can be added to increase this function.

This device has been designed so that it will not pass through the hole that has been bored in the ice for the purpose of using this product in conjunction with an underwater camera.

DETAILED DESCRIPTION OF THE DRAWINGS

Figure 1:
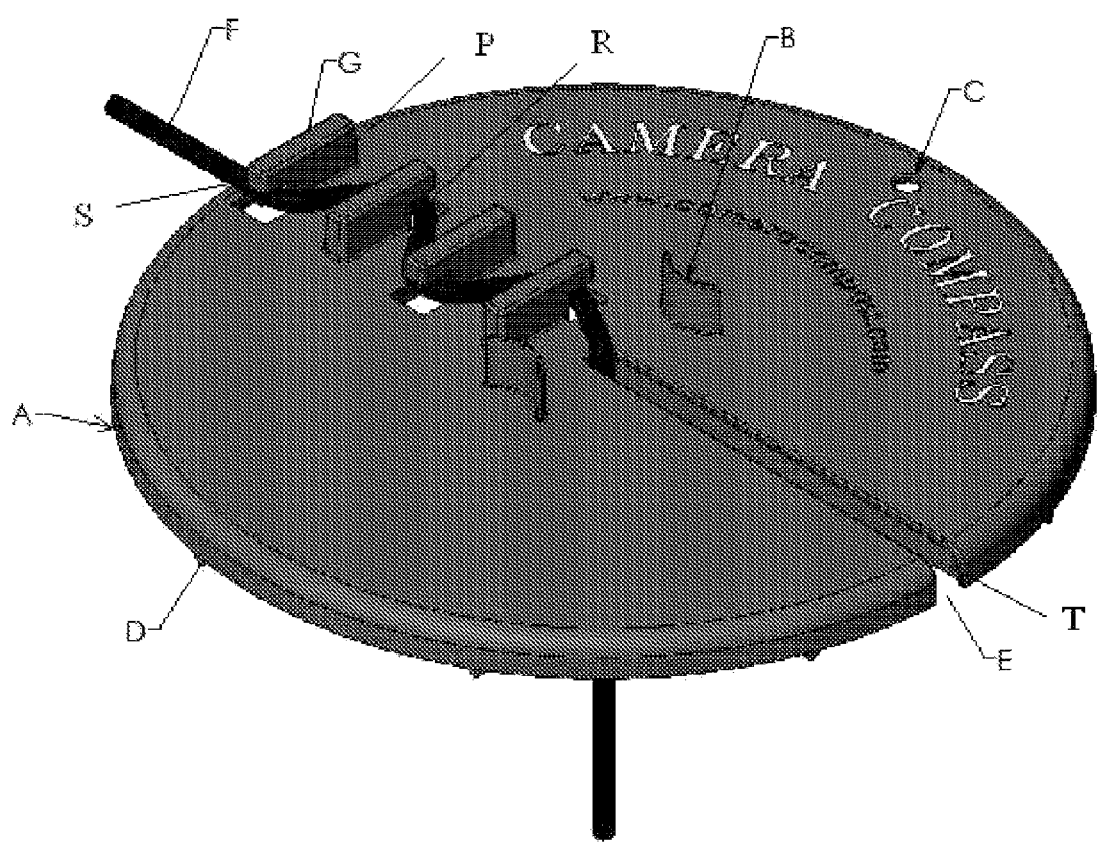
FIG. 1 is a side/top-angled view of the product with arrows and letters pointing to its components.

FIG. 1 shows the product A with a camera cable F passing through the slot E while secured to the molded cleats G. The cleats G are preferably aligned on a radius of the disk and have a post portion P attached to the disk with a top portion S extending over one end of the post portion to hold the cable between the disk top surface and the top portion S. The cleats G preferably have a cable receiving portion R on alternating sides of the cleat G for snaking the cable F between the cleats G thereby holding the cable F from slipping or moving relative to the disk. The device A is preferably a single molded plastic piece. The tabs B are used to pick up or turn the device A by grasping with the forefinger and thumb of a human hand. The triangular ice spikes D are designed to provide grip to the ice so the device A will not spin or rotate by itself. The display hole C is merely a hole designed to allow retail sellers of the product a means to hang the product on a conventional metal arm commonly found in such locations. The device A is designed with a span of 27.9 cm (11 inch) wide so as it will not pass through a common 25.4 cm (10 inch) diameter or smaller hole made by an ice auger. Insulation T can be added to impede the ice hole freezing up.

Figure 2:
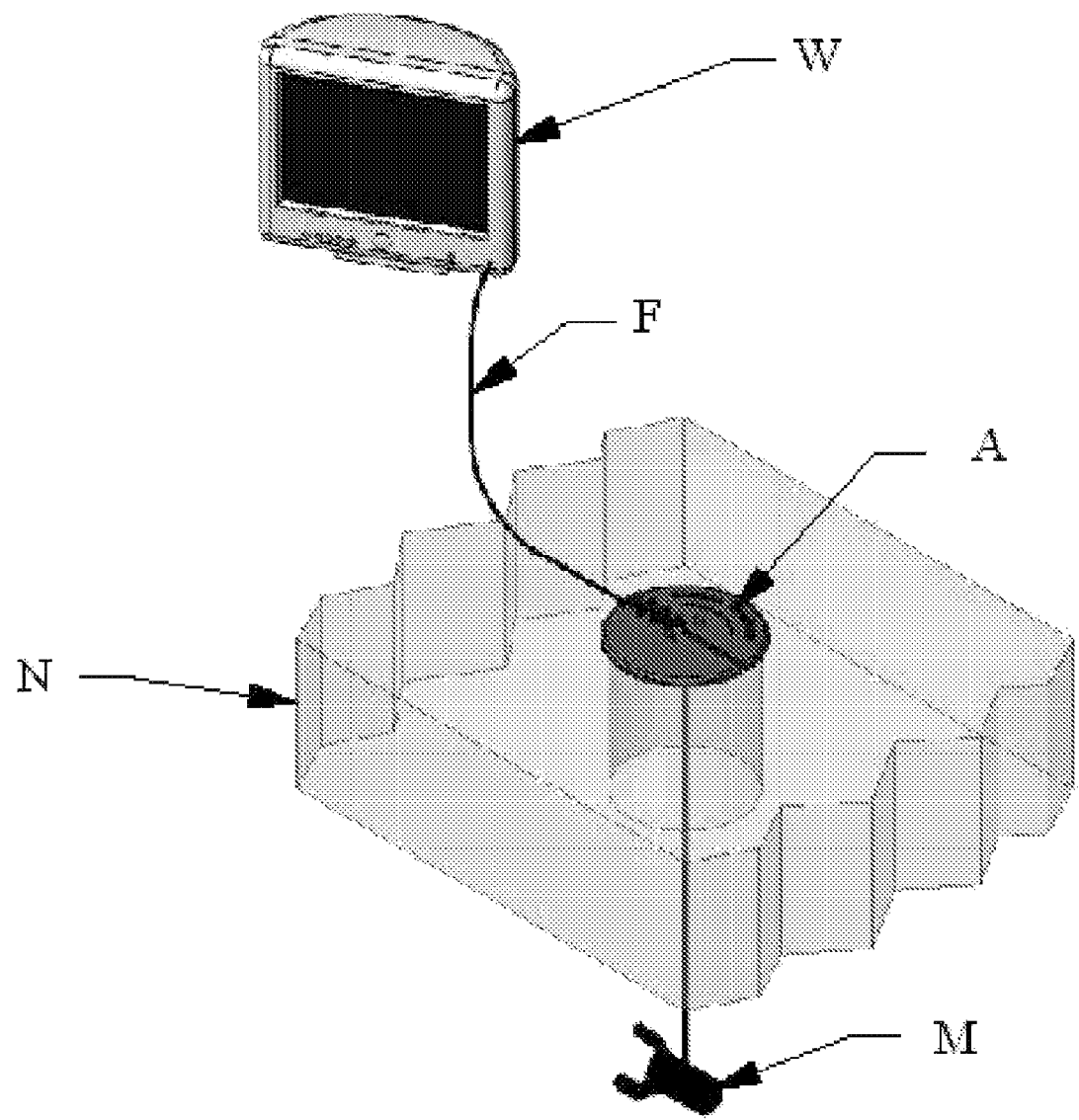
FIG. 2 is a perspective view showing the intended placement and usage of the device in conjunction with an underwater camera while on a frozen body of water.

FIG. 2 shows the device A being used as it is intended. The underwater camera M is submerged under the crust of ice N. The camera cable F passes through the slot E and is secured to the device A by means of the molded cleats G. The camera cable F then continues to the monitor W. The device A is resting directly on the ice N and the ice spikes D are minutely piercing the ice N as to hold it in position.

What is claimed is:

1. An underwater camera cable securing and rotation device comprising:
    a disk with a plurality of cleats on the top for securing a cable,
    a plurality of ice spikes on the bottom of the disk for engaging ice and providing stable and adjustable directional positioning of the disk on the ice and of a secured cable under the ice,
    a slot extending inward from the edge of the disk allowing the cable to pass through the disk,
    a handle device enabling a user to adjust the directional position of the disk.

2. An underwater camera cable securing and rotation device as in claim 1 wherein the handle device further comprises tabs on the top of the disk enabling the user to lift and rotate the disk using two fingers.

3. An underwater camera cable securing and rotation device as in claim 1 having:
    insulation attached to or in the disk to reduce ice formation under the disk when used during ice fishing.

4. An underwater camera cable securing and rotation device as in claim 1 having:
    cleats aligned in a row on a radius of the disk.

5. An underwater camera cable securing and rotation device as in claim 2 having:
    insulation attached to or in the disk to reduce ice formation under the disk when used during ice fishing.

6. An underwater camera cable securing and rotation device as in claim 5 having:
    the cleats aligned in a row on a radius of the disk.

7. An underwater camera cable securing and rotation device as in claim 5 having:
    the slot aligned on a radius 180 degrees from the cleat row alignment radius to form a straight line across the top of the disk.

* * * * *